July 28, 1959 R. O. WOELFER 2,896,520
MACHINE FOR HANDLING CARTONS TO BE FILLED
Filed Feb. 29, 1956 15 Sheets-Sheet 2

Inventor:
Robert O. Woelfer
By A. D. T. Libby
Attorney.

July 28, 1959 R. O. WOELFER 2,896,520
MACHINE FOR HANDLING CARTONS TO BE FILLED
Filed Feb. 29, 1956 15 Sheets-Sheet 14

Inventor:
Robert O. Woelfer
By A. D. T. Libby
Attorney.

July 28, 1959 R. O. WOELFER 2,896,520
MACHINE FOR HANDLING CARTONS TO BE FILLED
Filed Feb. 29, 1956 15 Sheets-Sheet 15

Inventor-
Robert O. Woelfer:
A. D. T. Libby
Attorney.

United States Patent Office 2,896,520
Patented July 28, 1959

2,896,520

MACHINE FOR HANDLING CARTONS TO BE FILLED

Robert O. Woelfer, Oak Tree, N.J.

Application February 29, 1956, Serial No. 568,530

13 Claims. (Cl. 93—53)

This invention relates to a machine that is capable of handling cartons of different sizes for receiving goods of different kinds of material.

The mechanism to be hereafter described is particularly adapted to be adjusted to receive different sizes of cartons and to open them up and carry them to filling and closing positions. After much study and work with the apparatus or mechanism shown in my Patent 2,643,497, issued June 30, 1953, I have discovered how to make a much simplified mechanism to eject and set up cartons ready for filling in a cheaper and more effective manner than set forth in the above mentioned patent. In my present construction, the cartons are pulled from their receptacle by suction means operated in timed relation with the parts that open and move them through the machine. The moving mechanism includes a pair of vertically spaced sprocket driven chains, moving in synchronism, each on its own track. One of these chains preferably the upper one can, along with its cooperative parts and track be vertically adjusted with respect to its mate so as to handle cartons of different lengths, which is a requirement of the goods to be placed in the cartons. These chains or conveyors carry pushers spaced along the chain to suit the size of the cartons, and after engaging a carton following its discharge from the containers, the chain pusher moves the carton which it engages, to its filling and closing positions. Suitable means are provided to make this vertical spacing adjustment of the chains.

In the drawing 1 is a table or platform on which the greater part of the mechanism is mounted. Supported on the table 1, at least in part, is a vertically positioned driving shaft 2, carrying a gear wheel 3 that operates a link-type chain 4 which carries a plurality of pushing members 5 in proper spaced relation for the purpose to be presently described. The shaft 2 carries a cam member 6. Also supported on the table 1 is a shaft 7 on which is a pivotedly carried lever 8 having an arm 9 that carries a roller 10 for cooperation with the cam member 6. The end 11 of the lever 8 has a bifucated portion 12 between the arms of which is carried a stud 13 that is fastened to a hollow plunger 14 through the outer end of which is attached a flexible air pipe 15. The inner end of the hollow plunger 14 terminates in a hollow stud 16 to the inner end of which is fastened a suction cup 17 of suitable material such as soft rubber. Connected to the stud 13 is a rod 18 to the lower end of which is pivoted at 19 a lever or arm 20 which acts as a carton holding arm, the action of which will be later described. The carton holding or arm lever is pivoted on a stud 21 which projects upwardly from the support plate 22. Associated with the hollow stud 16 is a hollow arm 23 having a cap end 24, engaging a cap 25 that is carried by rod 26 around which is positioned a spring 27 resting on a hollow support member 28, the tension of the spring 27 being set by nut 29 on the end of the rod 26, so when the parts are in the position shown in Figure 1, the opening into the hollow member 28 is closed, but as soon as the action of the lever 8, which is under tension of the spring 30, operates the plunger 14, this causes the suction cup 17 to withdraw a carton from the stack. At the same time the rod 26 moves upwardly allowing the spring 27 to expand and prevents the cap 25 from leaving the end 24 of member 23 so as not to break the vacuum at the cup 17, until the plunger 16 has fully withdrawn a carton, then the nut 29 stops the member 25 from further travel.

It is to be understood at this point, that the cartons, as shown in the stack in these figures, are open at both ends and there must be a closure means for the carton at both ends so that in the various figures, which are plan views looking down on the top of the apparatus, only one of the operating chains 4 is shown, there being another chain and associated parts for operating it in spaced relation directly below the position of the chain 4 shown in the various figures.

Figure 1:
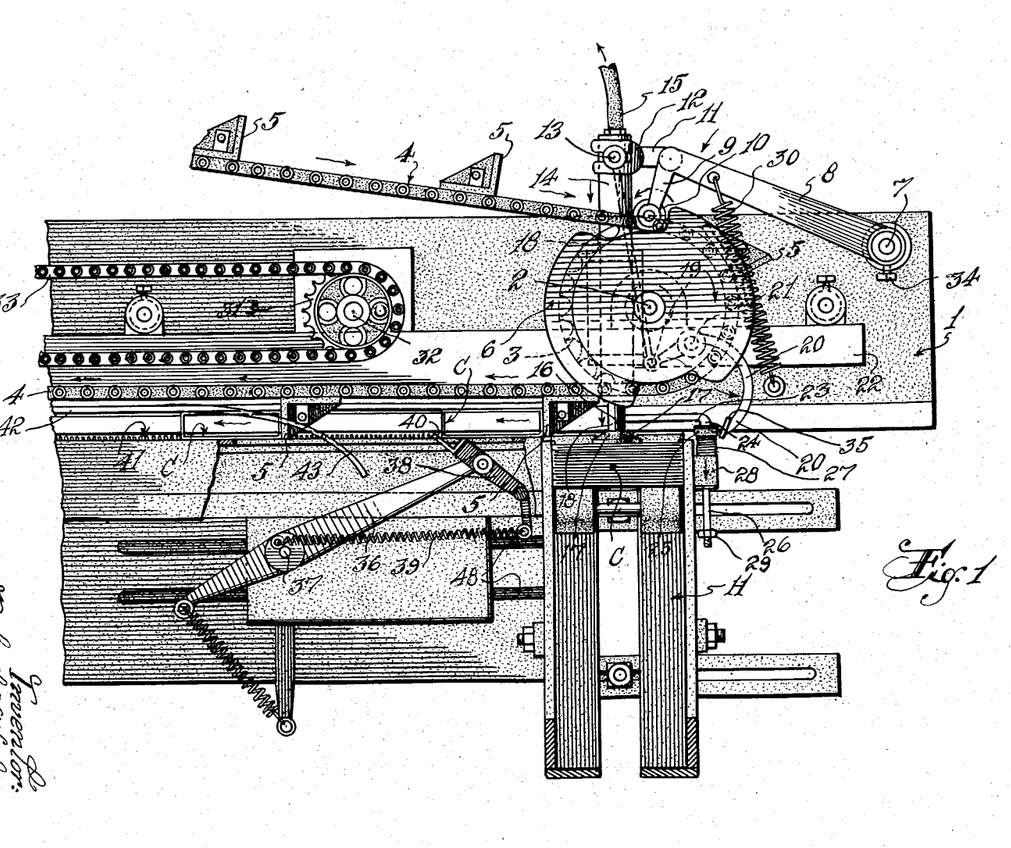
Fig. 1 is a top plan view of that part of the mechanism of my present machine wherein a carton has been withdrawn from a stack and has been opened up ready to be carried forward to the filling position.

Since the cartons, as utilized in the trade, are of different lengths, a means must be provided to adjust the relative vertical position of the two named chain drives to operate on these different lengths of cartons. This is done by adjustably mounting the top chain 4 and all of its associate parts of mechanism, only part of which is shown in Figure 1 and associated drawings. This adjustable means comprises sprocket wheels 31 carried by studs 32 arranged longitudinally of the apparatus in suitable numbers to give the necessary adjustment. The sprocket 31 carries a chain 33 that moves the associated parts all in synchronism, it being noted that the collar positioning the lever 8 is fastened to the stud 7 by an adjusting member 34. By having this means of adjusting the top plate and its associated track members, various lengths of cartons may be handled by this same mechanism.

Figures 2, 12:
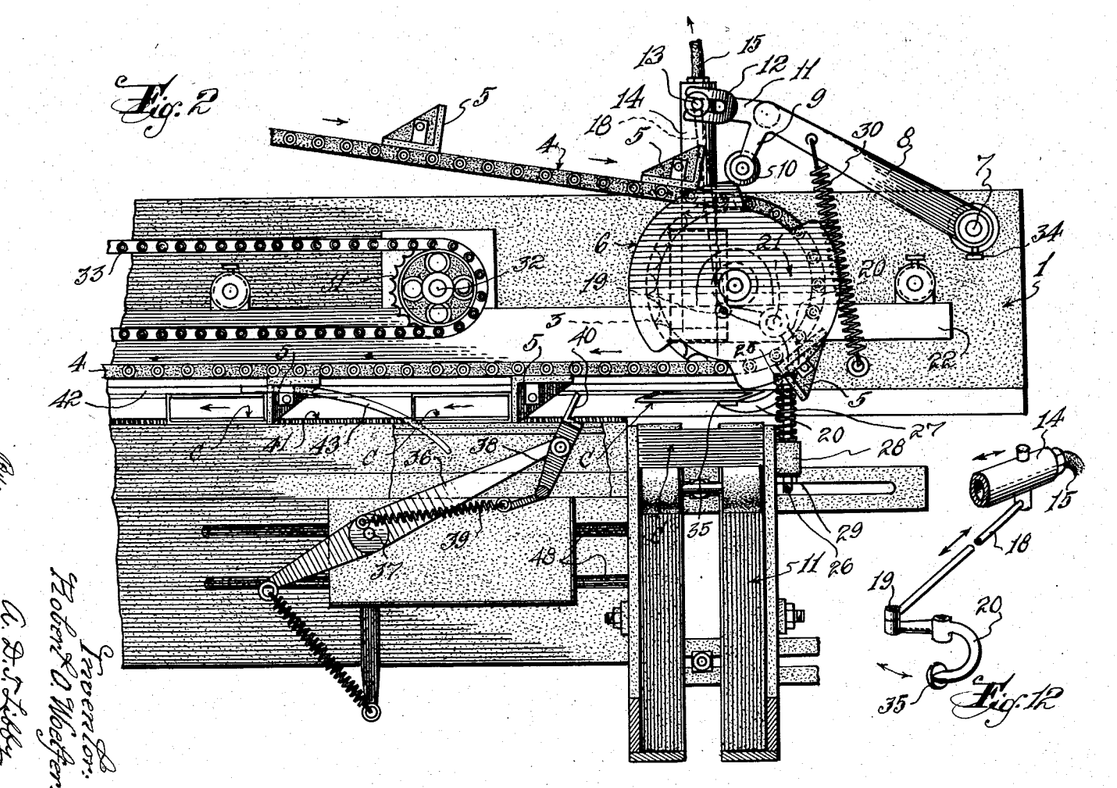
Figure 2 is a view of a carton withdrawn from the supply stock and showing the carton ready to be advanced to opening position.
Figure 12 is a perspective view of the parts for moving the carton directly after they are removed from the stack.
Figure 3:
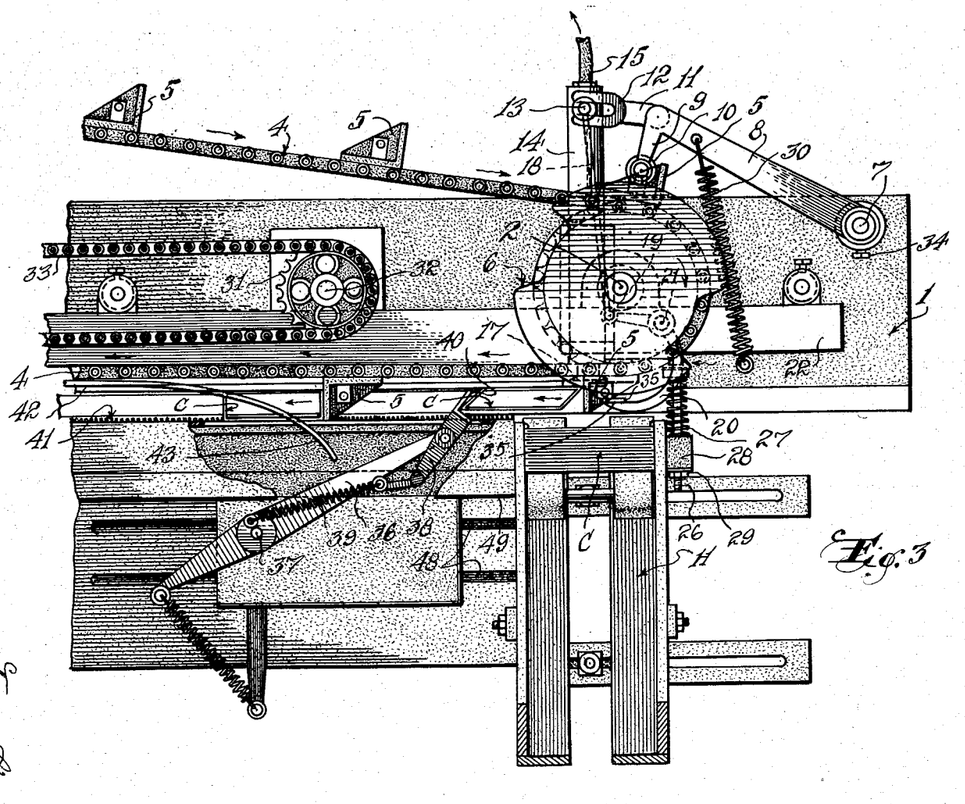
Figure 3 is a view of a carton showing the starting mechanism in a different position of operation.
Figure 4:
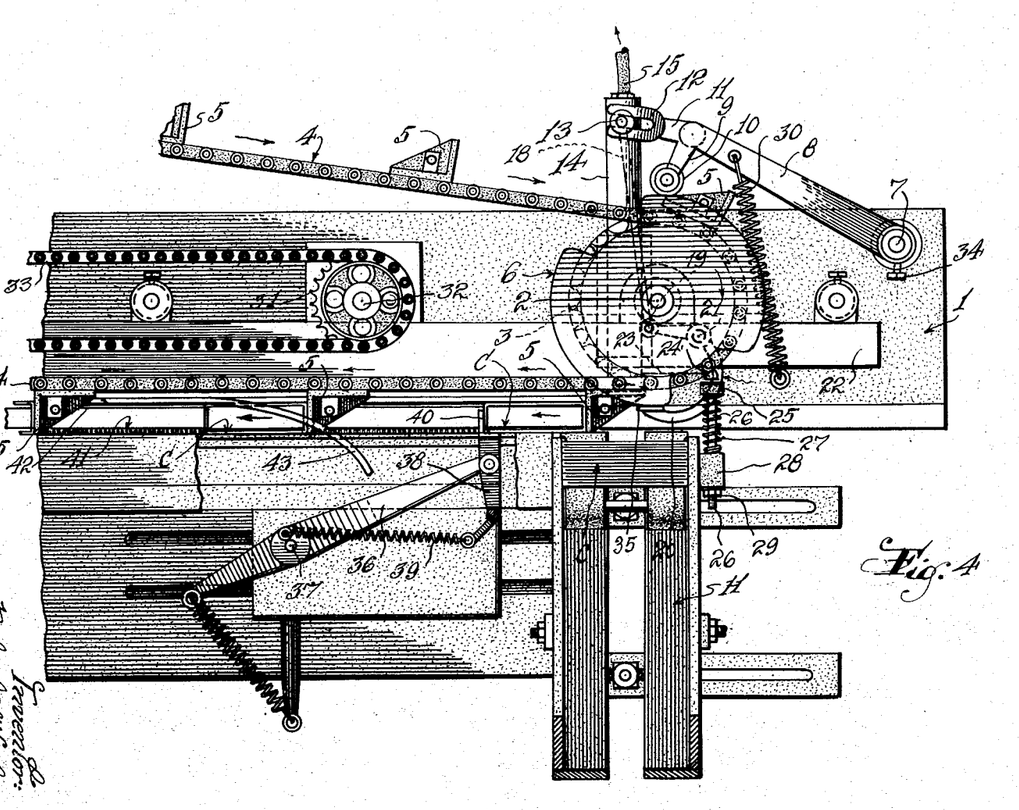
Figure 4 is a view similar to Figure 3 but with the parts in the next step of its operation.
Figure 5:
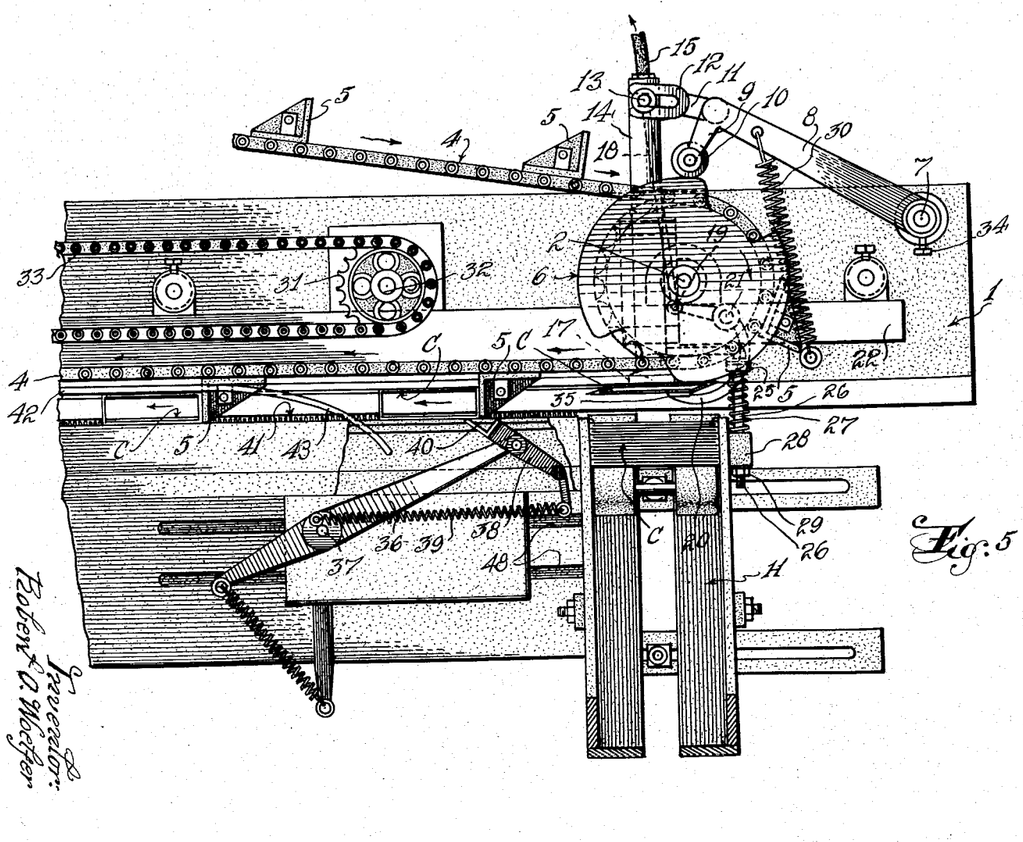
Figure 5 shows a view similar to Figure 4 but with the parts in a further advanced position of operation.
Figure 6:
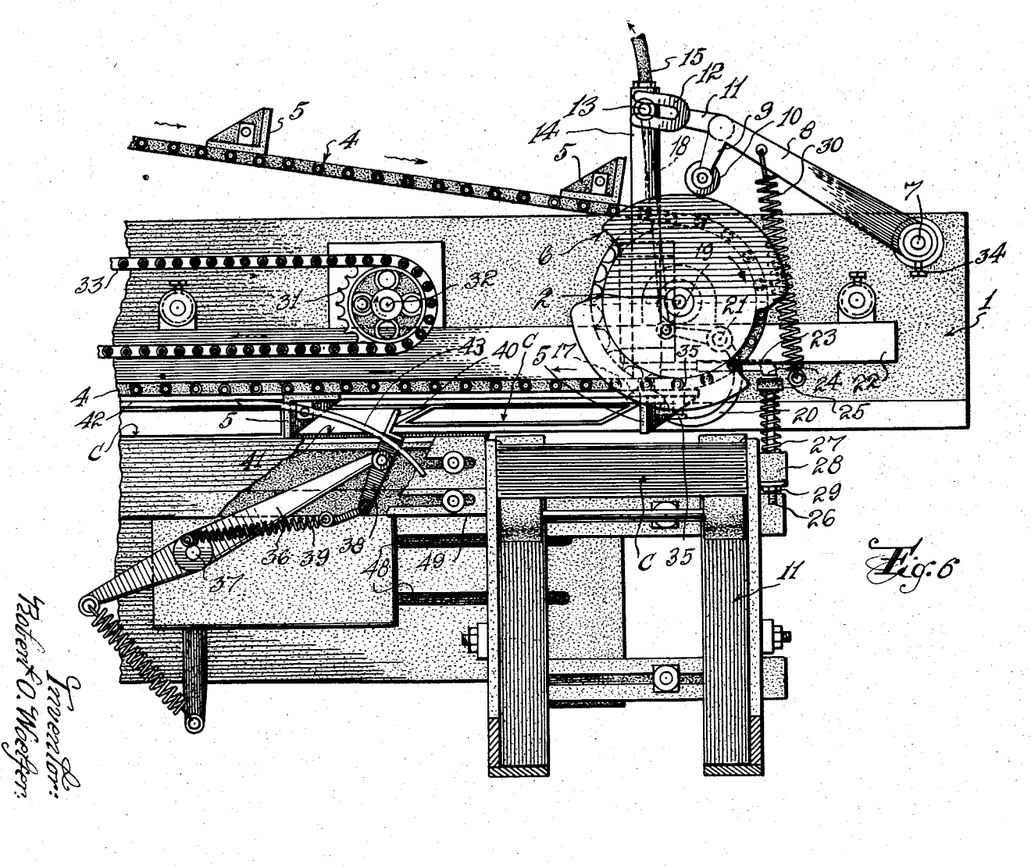
Figure 6 is a view similar to Figure 3 but with a larger size carton in the apparatus.
Figures 8, 9:
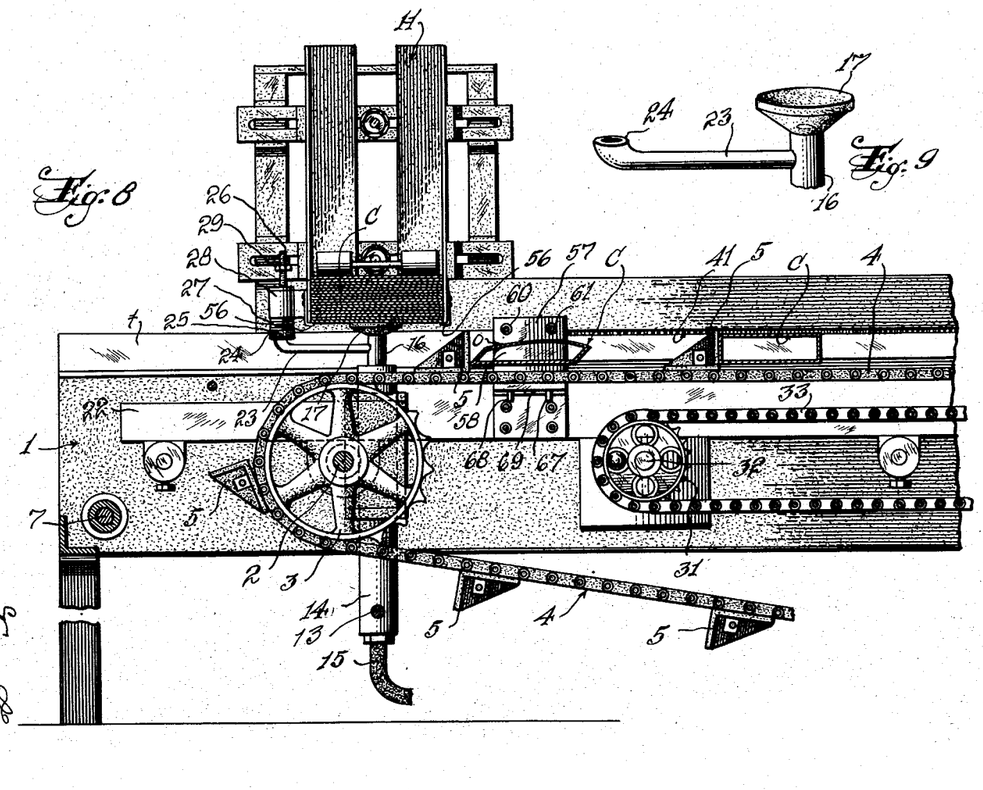
Figure 8 is a view of the mechanism of Figure 1 but arranged in a different manner for holding the cartons in a horizontal position rather than in a vertical position as described in Figures 1–7.
Figure 9 is a perspective view of a suction element that draws the cartons from the stack.

Coming now to the movement of the cartons through the machine, it will be noted that the carton holding arm 20 has an enlarged end or cap 35 which engages the carton that has been pulled from the stack so that it will be engaged by one of the pushers 5 to be moved forwardly on the guiding member t see Fig. 8. At the same time, a lever 36, see Fig. 6, pivoted at 37 is actuated from its normal idle position shown in Figures 1 and 5 to position shown in Figure 2. Pivotally carried on the end of the lever 36 is another lever 38 that is under control of the spring 39, and as one of the pushers 5 moves the cartons forward, the inner edge of the carton engages the end of the lever 38 and the carton is then moved to its opened position and advanced by the pusher 5 to the position shown in Figure 5, while another carton is being moved out of the stack as shown in Figures 1 and 2. Attached to the outer edges of the carton runway for at least a short distance is a strip of soft corrugated material 41 preferably of rubber which helps to hold the carton in its open position, also a flat guide member 42 having an outwardly positioned end 43 for engaging one of the top flaps of the carton and moving it to an open position where it is held by the member 42, as the carton moves along on the guide way. A somewhat similar guide member is located on the bottom of the runway to operate on the flap at the bottom end of the carton. As the carton is moved forward the application of adhesive to the flap and the filling and closing of the carton is fully set forth in my Patent 2,643,497 and no further description of these details seem to be necessary.

In Figures 1–5 cartons C are shown in one type of a carton holder or hopper entitled H, but as will be seen from these figures, the opposite parts of the holder or hopper are laterally adjustable to accommodate cartons of various widths.

Figure 7:
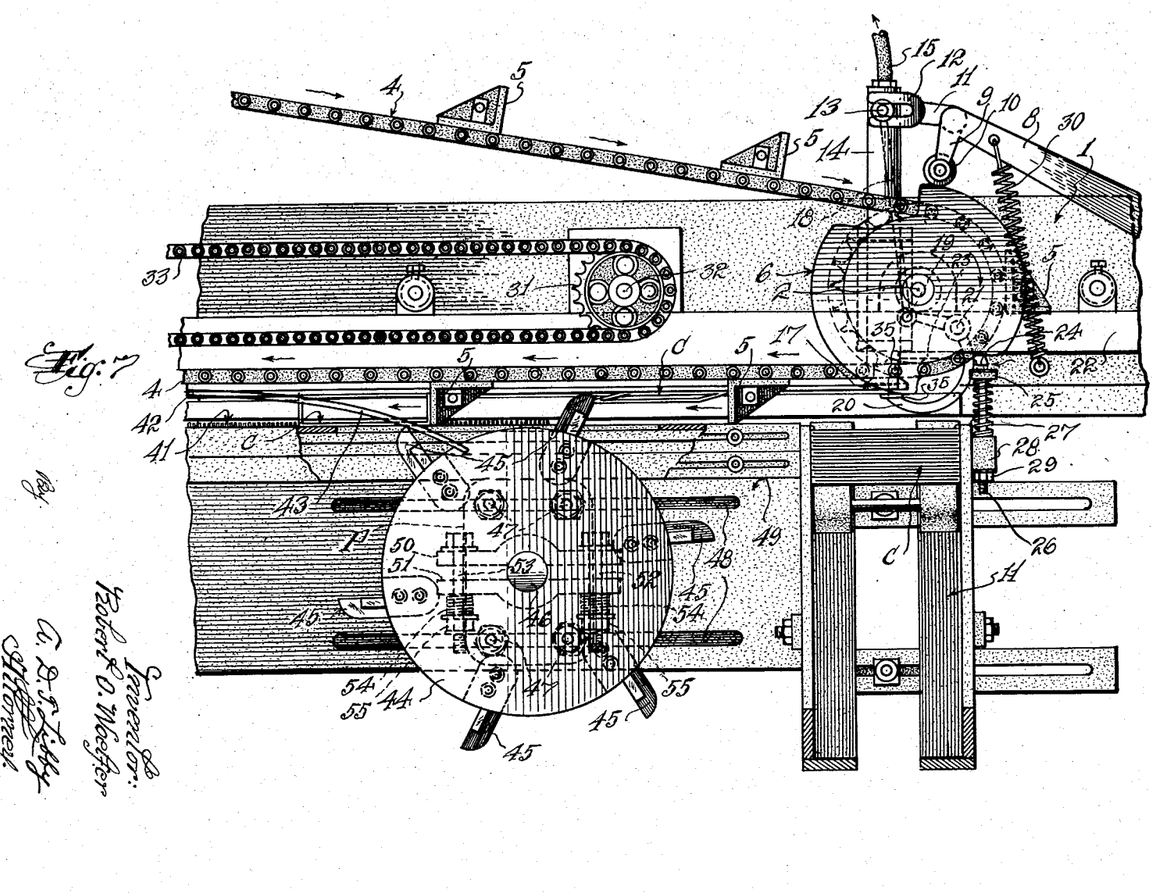
Figure 7 is a view somewhat similar to Figure 6 but with a different type of means for handling a carton on the machine.

In Figure 7 I have shown a disc 44 having a plurality of fingers 45 to help open the cartons the same as the levers 36 and 38. The disc 44 is rotatably carried on a stud shaft 46, which in turn is carried on a support plate P having studs 47 that are slidable in slots 48 in the member 49. By this adjustment the plate P can be positioned to handled cartons of various widths. The stud shaft 46 carries, preferably below the disc 44, a pair of yoke members 50 and 51 which are held together by a pair of screws 52 and 53 each of which carries a spring 54 the tension of which may be adjusted by nuts 55 to apply sufficient friction on the shaft 46 for cooperative action with the pusher 5 to open the cartons as they are fed through on the chains 4.

Figures 10, 10A:
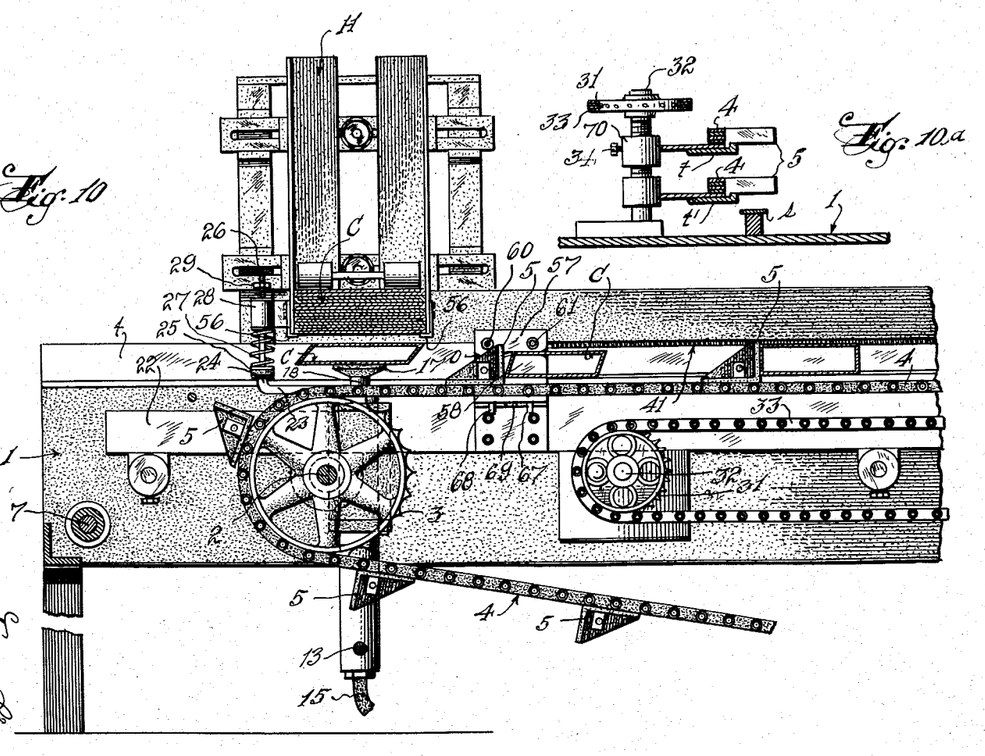
Figure 10 is a view similar to Figure 8 but with the parts in a different position of operation.
Figure 10a is a schematic view showing parts of the lower and upper tracks used in the previous figures.
Figure 30:
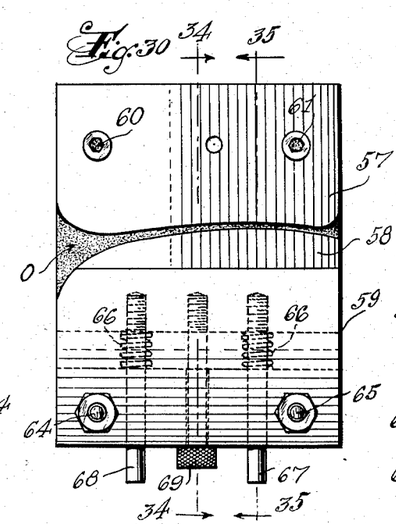
Figure 30 is a side elevation of one of the pressure blocks or clamps which are shown to the right of Figures 16–18.
Figure 31:
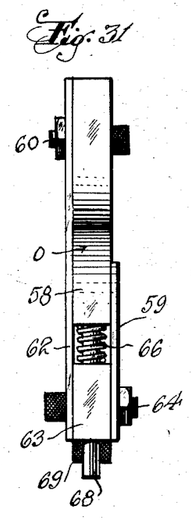
Figure 31 is a view of Figure 30 looking from left to right.
Figure 32:
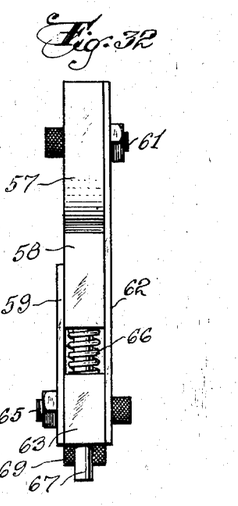
Figure 32 is a view of Figure 30 looking from right to left.
Figure 33:
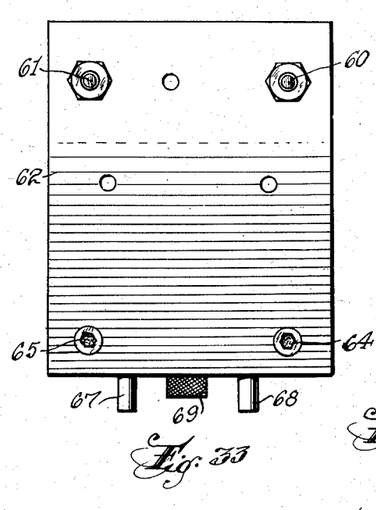
Figure 33 is a view of the back side of Figure 30.
Figure 34:
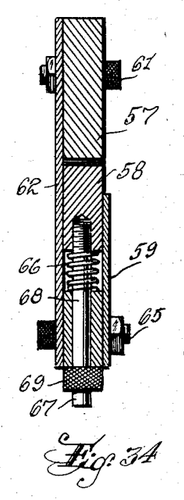
Figure 34 is a sectional view on the lines 34—34 of Figure 30.
Figure 35:
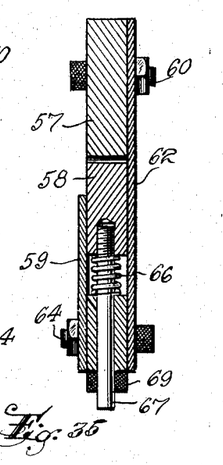
Figure 35 is a view in the line of 35—35 of Figure 30.

In Figures 8 and 10, I have shown a carton container and the conveyor means from the opposite position or side from that shown in Figures 1–7, wherein the drive chains 4 are in laterally spaced relation instead of vertically spaced relation as in Figures 1–7, but the adjusting means for getting this lateral spacing is the same as in Figures 1–7. While friction on the side walls of the holder or hopper H at the lower end, might be used to hold the cartons from falling out, I prefer to use the construction of Figures 8 and 10, wherein the cartons are held in a horizontal position and are prevented from falling out by hooks 56, but when suction is applied by the suction mechanism, shown in a figure heretofore described, the carton that is engaged by the suction member 17 is slightly bent and pulled downwardly out of the stack on the track member t where it is engaged by one of the pushers 5 on chain 4 and also engaged near the bottom by pusher 5 on the other chain which is like 4 on Fig. 8 which carries the carton forward in a semi-open position, hence to further open the carton, the pusher 5 moves the forward edge of the carton into the opening O between the two pressure clamps 57 and 58, see Figures 30–35. The pressure clamp 57 is held in position by a pair of studs 60 and 61 while the pressure clamp 58 is held in spaced relation by a spacer block 63 and the studs 67 and 68, and positioned between the plates 59 and 62, is a pair of springs 66 which are located on studs 67 and 68. The push of the pressure clamp 58 is controlled by the adjusting screw 69. The passage of the carton through the members shown in Figure 30 is illustrated in Figures 26–29. The cooperative action between the pushers 5, which act on the bottom, and the pressure clamps 57 and 58 which act on the top as shown in the drawing have the effect of opening up the carton ready to be passed forward to the filling station.

It may be noted in passing that Figure 10a shows a small sectional view of the relationship of the two vertically spaced tracks t and t'. While the tracks t and t' are shown in two pieces, they can each be made in one piece. Carried on tracks t and t' are the pushers 5, and as heretofore stated in the earlier part of the specification, the track t' is stationary, while the track t is adjustable in the vertical position so as to accommodate different sizes of cartons. By way of illustration, the track t is carried at one place along the length of the track, by a collar 70 on the screw stud 32 which carries the sprocket wheel 31 that is used for adjusting the vertical spacing between the two tracks.

Figure 11:
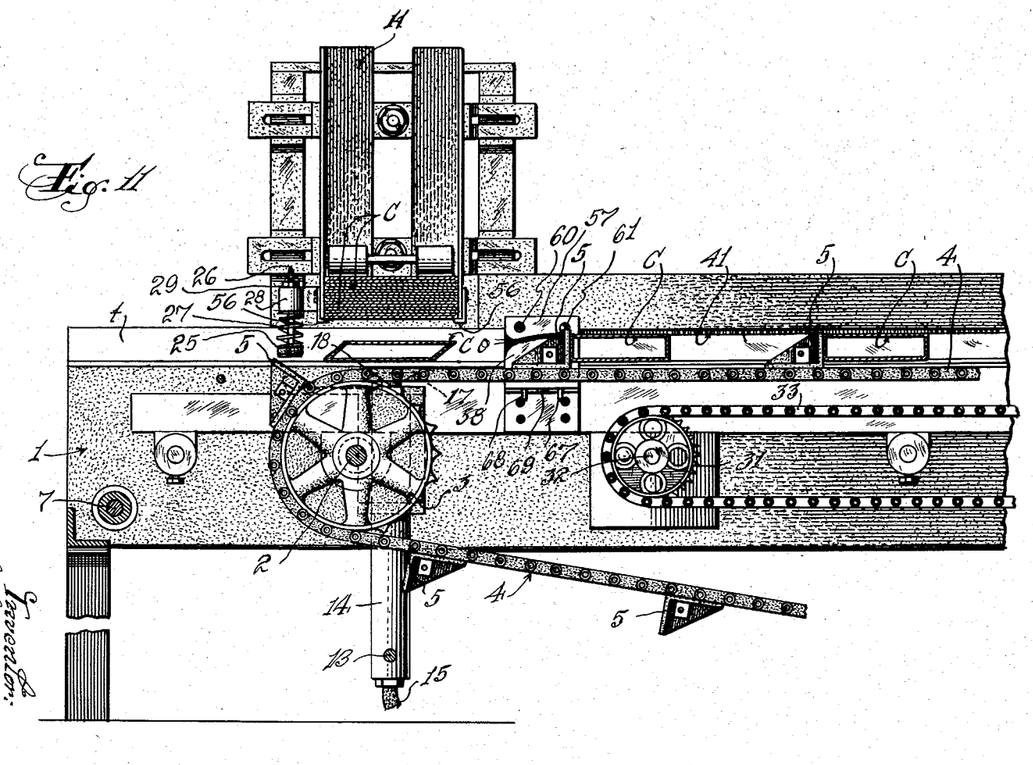
Figure 11 is a view similar to Fgures 8–10 but with the mechanism in a different position of operation.

Figure 11 is quite similar to Figure 10, but with the pusher on the chain just beginning to move the carton between the pressure clamps as previously described.

Figures 13, 14:
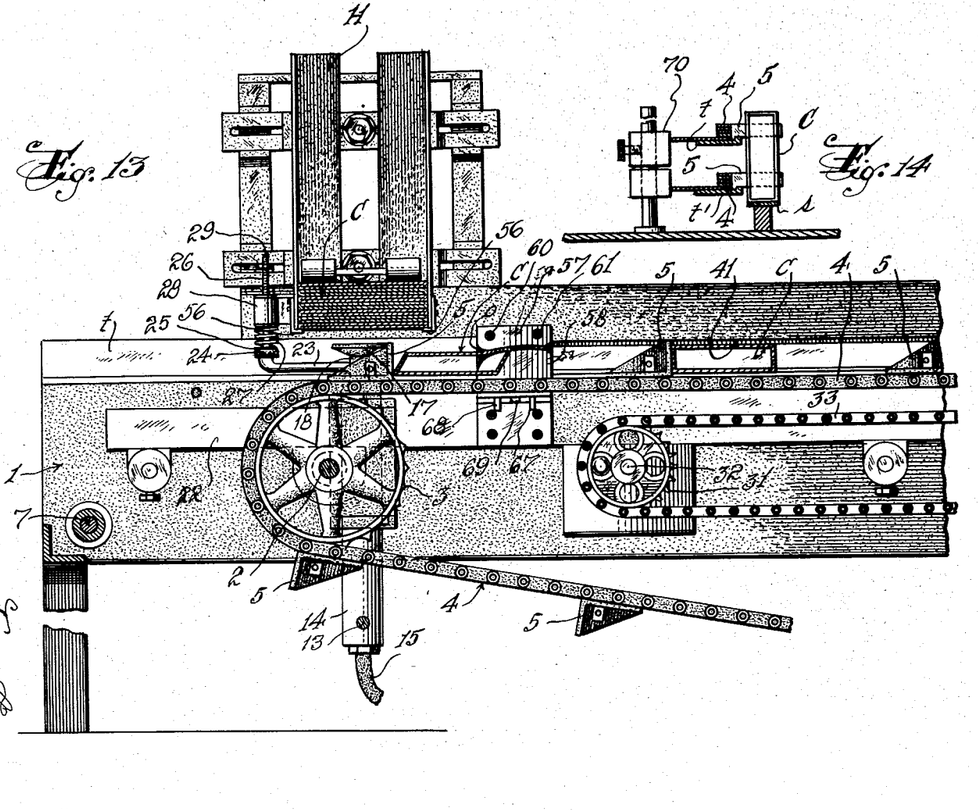
Figure 13 is a view similar to Figure 10 but with the parts in a slightly different position of operation.
Figure 14 is a view similar to Figure 10a but showing a different means of adjustment of certain parts.

Figure 13 is a view similar to Figure 10, but with the pusher on the chain just beginning to move the carton between the pressure clamps as previously described.

Figure 14 is a view similar to Figure 10a, but showing the carton C resting on a longitudinally extending support member s.

Figures 14A, 15:
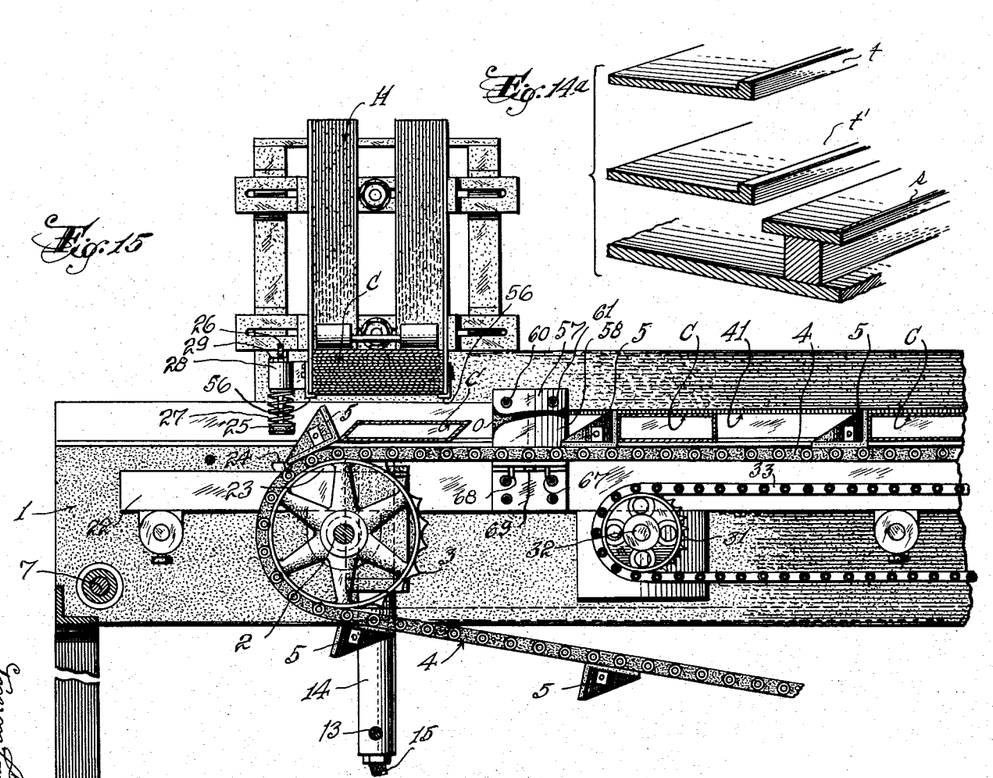
Figure 14a is a fragmentary sectional view of the carton support and the special adjustable tracks for conveying the cartons.
Figure 15 is a view similar to Figure 11 but with the parts in a different position of operation.

Figure 14a needs no further description than that given to it in the preliminary description of the various figures.

Figure 15 shows a plurality of cartons which are passed through the pressure clamps and with a partially closed carton just being engaged by the pusher 5.

Figure 16:
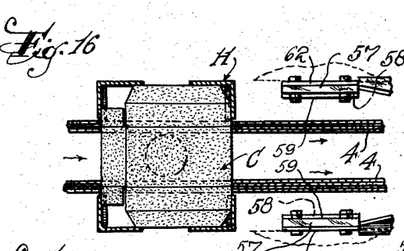
Figure 16 is a plan view of the hopper that is holding the stack of cartons above the conveyor chains.
Figure 17:
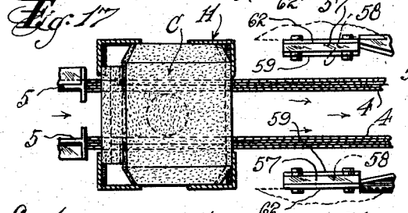
Figure 17 is a view similar to Figure 16 but showing pushers carried by the vertically spaced driving chains.
Figure 18:
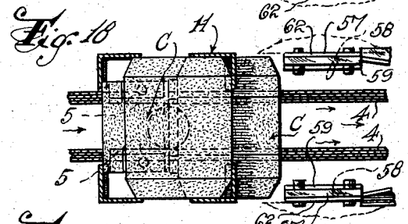
Figure 18 is a view similar to Figure 16 but one of the cartons is being moved out of the hopper.
Figure 19:
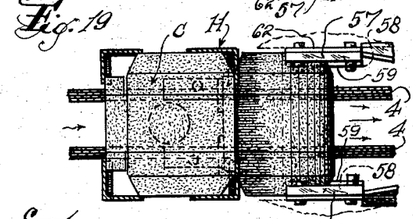
Figure 19 is a view similar to Figure 18 but with the cartons in a further advanced position and passing into the pressure clamps which are shown in Figure 30.
Figure 20:
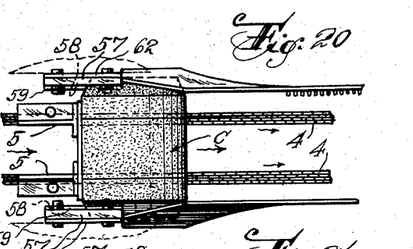
Figure 20 is a view similar to Figure 19 but with the carton in a further advanced position and about to engage the carton flap guides.
Figure 21:
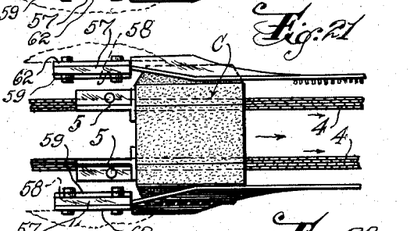
Figure 21 is a view similar to Figure 20 with the carton in a still further advanced position.
Figure 22:
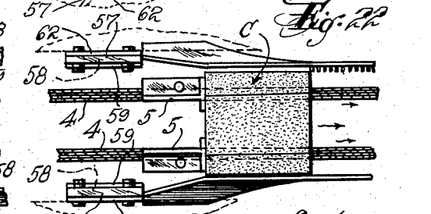
Figure 22 is a view similar to Figure 21 with a further advanced position of the carton.
Figure 23:
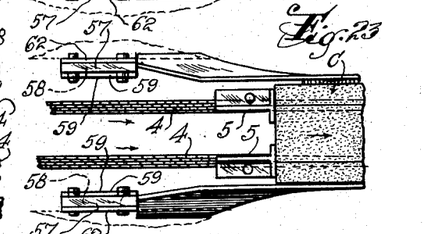
Figure 23 shows the carton advanced to the position where it is in contact with the flap guide.
Figure 24:
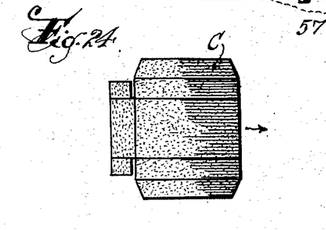
Figure 24 is a view of the carton in one of its flat positions.
Figure 25:
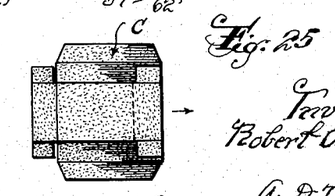
Figure 25 is similar to Figure 24 but with the flaps in a different position.
Figures 26, 27, 28:
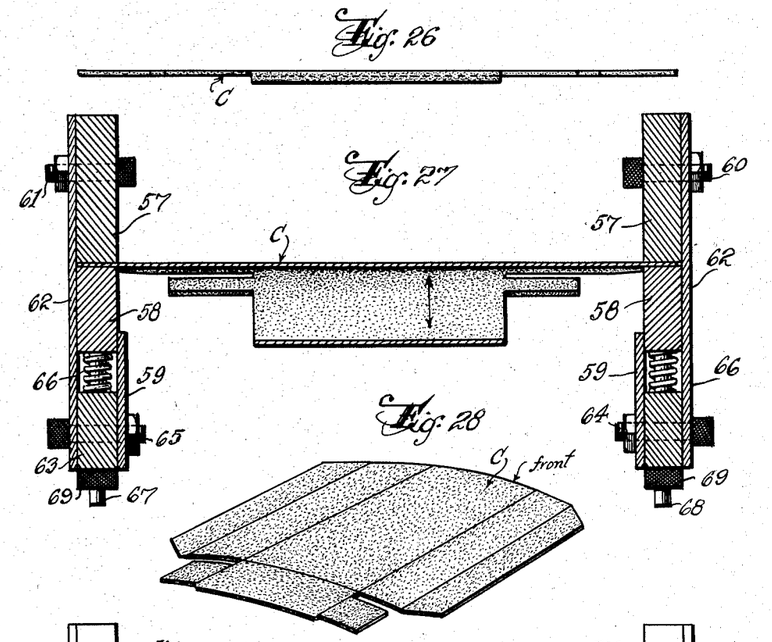
Figure 26 is an edge view of the carton in a flat unopened position.
Figure 27 is a sectional view of the carton of Figure 26 partially opened up and being moved through the pressure clamps that holds the carton in a temporary operating position.
Figure 28 is a plan view of the carton as it would appear out of the position shown in Figures 27 and 29.
Figure 29:
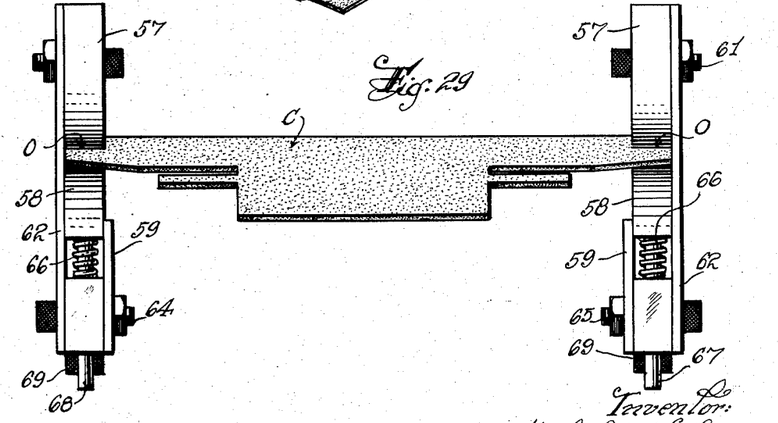
Figure 29 is a full view of the carton as shown in Figure 27.

Figure 16. On the preliminary part of the specification, Figure 16 is a plan view looking down on a stack of cartons within the holder or hopper H, but with the chains in a laterally spaced relation as shown in Figure 8 and succeeding figures. In Figure 16, each of the chains 4 is associated with a pressure block arrangement as shown in Figure 30.

Further descriptive matter, with respect to Figures 16 through 25, does not seem to be necessary in view of the description of these specific figures.

What I claim is:

1. A machine having means for receiving cartons in folded style, said machine having conveyor chains with spaced pushers attached thereto and also having a runway to receive the cartons, and pressure applying devices to receive the cartons by their flaps to press them at the filling ends in such a manner whereby the flaps will readily open after they are pushed through the pressure devices by the chain pushers.

2. A machine as set forth in claim 1 further defined in that each machine has a fixed member with an orifice therethrough to receive a flap at one end of a carton and an adjustable member with means for adjusting it so the pressure applied to the carton flaps may be regulated as and for the purposes described.

3. A machine having means for receiving cartons in folded style, said machine having conveyor chains with spaced pushers attached thereto and also having a runway to receive the cartons, and pressure applying devices to receive the cartons by their flaps to press them in such a manner that the flaps will readily respond for the filling operation as the cartons are moved through the machine by the chain pushers.

4. A machine having means for receiving cartons in folded style, said machine having a runway to receive the cartons and also having suction means for engaging a carton and moving it directly into said runway at predetermined intervals, means for moving the carton along the runway, and pressure applying devices to engage said cartons to cause them to open up, suitable for filling purposes as they are being moved along said runway by said moving means.

5. A machine as set forth in claim 4, further defined in that said moving means includes a pair of chains arranged in suitable spaced relation, depending on the length of the cartons that are being handled.

6. A machine as set forth in claim 5, further defined in that means are provided for adjusting the distance between said pair of chains throughout their length to take care of groups of cartons of different sizes.

7. A machine having means for receiving cartons in folded style, said machine having a runway to receive the cartons and also having suction means for engaging a carton and moving it directly into said runway at predetermined intervals, means for moving the carton along the runway, an auxiliary lever having a free end, means for moving said auxiliary lever so its free end will come into contact with a carton and hold it in operative position after the suction means has been released, and means for moving said lever back to its initial runway position as soon as the carton has moved from its initial runway position.

8. A machine as set forth in claim 4, further defined in that means are provided for automatically moving the suction means to and from its suction position in accord with the movement of the cartons along the runway.

9. A machine as set forth in claim 4 further defined in that means are provided for insuring that the suction on the carton is not released until the carton is positively moved into the runway and further defined in that the length of time that suction is applied to a carton is controlled by a hollow support member carrying an adjustable rod going through it and carrying on its upper end a cap that is engaged by a cap carried by a hollow member connected to the source of suction that is applied to a carton, and a spring operatively positioned around said rod and between said hollow support member and the said cap on the rod end for the purpose described.

10. A machine as set forth in claim 4 further defined in that said means for moving the cartons along the runway includes a pair of endless chains arranged in spaced relation according to the length of the cartons, the chains carrying pushing devices for engaging the cartons intermediate their ends, and means for insuring that suction is not released from the carton until an auxiliary lever with a free end is moved to a position whereby the carton will be held in position to be engaged by said moving means after the suction is removed from the carton.

11. A machine having means for receiving cartons in folded style, said machine having a runway to receive the cartons and also having suction means for engaging a carton and moving it directly into said runway at predetermined intervals, means for moving the carton along the runway, and lever means for engaging the forward end of a moving carton to open the carton ready to be moved to the filling position.

12. A machine as set forth in claim 11 further defined in that guide means engages the carton flaps and holds the top flap in open position while the bottom flap is moved to closed position.

13. A machine as set forth in claim 11 further defined in that said combination of levers may be in the form of a rotatable adjustable disc having extending arms for engaging the cartons as they are moved forward by said moving means.

References Cited in the file of this patent

UNITED STATES PATENTS

| | | |
|---|---|---|
| 2,318,208 | First et al. | May 4, 1943 |
| 2,441,372 | Quigley | May 11, 1948 |
| 2,521,996 | Ray et al. | Sept. 12, 1950 |
| 2,586,006 | Conti | Feb. 19, 1952 |
| 2,612,823 | Woelfer | Oct. 7, 1952 |
| 2,643,497 | Woelfer | June 20, 1953 |
| 2,646,656 | Wahl | July 28, 1953 |
| 2,662,355 | Ross | Dec. 15, 1953 |
| 2,665,044 | Monroe et al. | Jan. 5, 1954 |
| 2,737,001 | Bucha | Mar. 6, 1956 |
| 2,739,430 | Griswold | Mar. 27, 1956 |
| 2,747,348 | Rose | May 29, 1956 |